United States Patent [19]

Norris

[11] 4,360,052
[45] Nov. 23, 1982

[54] PORTABLE TIRE TOOL

[76] Inventor: Peter J. Norris, 9640 Stonehurst Ave., Sun Valley, Calif. 91352

[21] Appl. No.: 331,639

[22] Filed: Dec. 17, 1981

[51] Int. Cl.³ ............................................. B60C 25/04
[52] U.S. Cl. .................................................. 157/1.3
[58] Field of Search ............... 157/1, 1.1, 1.17, 1.24, 157/1.3

[56] References Cited

U.S. PATENT DOCUMENTS

| | | | |
|---|---|---|---|
| D. 57,549 | 4/1921 | Van Kuren. | |
| 819,156 | 5/1906 | Morrill | 157/1.1 |
| 1,217,009 | 2/1917 | Kavanagh. | |
| 1,219,948 | 3/1917 | Kaehler | 157/1.1 |
| 1,220,956 | 3/1917 | Coffman | 157/1.1 |
| 1,233,012 | 7/1917 | Ashbaugh et al. | 157/1.17 |
| 1,493,153 | 5/1924 | Hartsock | 157/1.17 |
| 1,520,599 | 12/1924 | Robertson | 157/1.1 |
| 2,112,661 | 3/1938 | Abrahams | 157/1.3 X |
| 2,241,886 | 5/1941 | Pearce et al. | 157/1.17 |
| 2,305,886 | 12/1942 | Mahler | 157/1.17 |
| 2,319,155 | 5/1943 | Passanante et al. | 157/1.17 |
| 2,500,319 | 3/1950 | Neely | 157/1.17 |
| 2,501,225 | 3/1950 | Kuhlmann | 157/1.17 |
| 2,521,383 | 9/1950 | Malachowski | 157/1.3 |
| 2,527,102 | 10/1950 | Miess | 157/1.17 |
| 2,545,483 | 3/1951 | Martin | 157/1.3 |
| 2,647,565 | 8/1953 | Patterson | 157/1.17 |
| 2,925,857 | 2/1960 | Twiford | 157/1 |
| 4,271,884 | 6/1981 | Udall et al. | 157/1 |

FOREIGN PATENT DOCUMENTS

| | | |
|---|---|---|
| 694973 | 7/1953 | United Kingdom. |
| 700816 | 12/1953 | United Kingdom. |

*Primary Examiner*—James G. Smith
*Attorney, Agent, or Firm*—Poms, Smith, Lande & Rose

[57] ABSTRACT

A portable tire tool adapted for removing and installing tires. The tool includes a lever arm, tire pry arm, and J-shaped hook arm which may be connected in different configurations to provide various tools for removing and installing tires. The tool is conveniently shaped to allow assembly in a compact configuration for transportation and storage.

9 Claims, 10 Drawing Figures

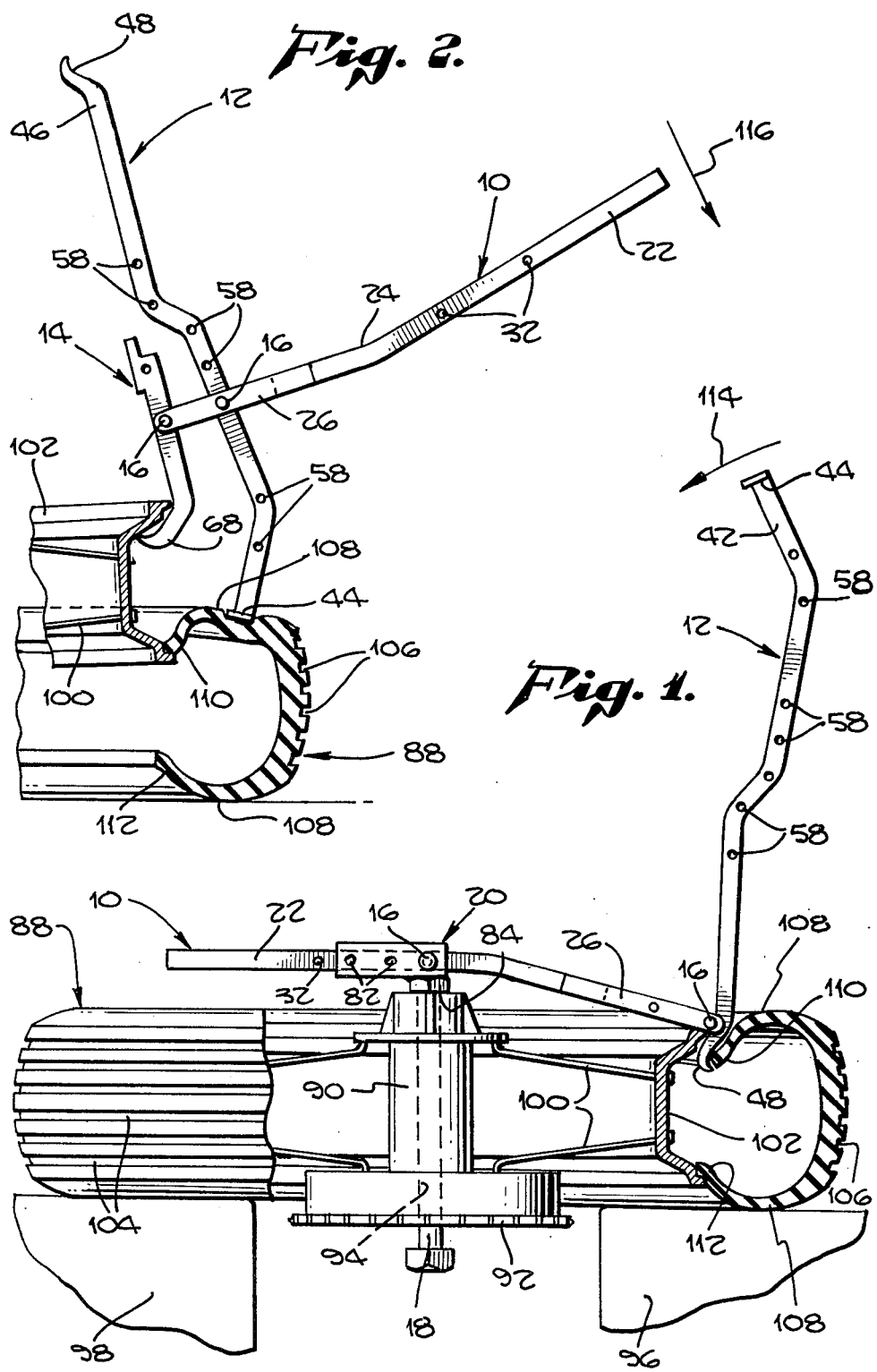

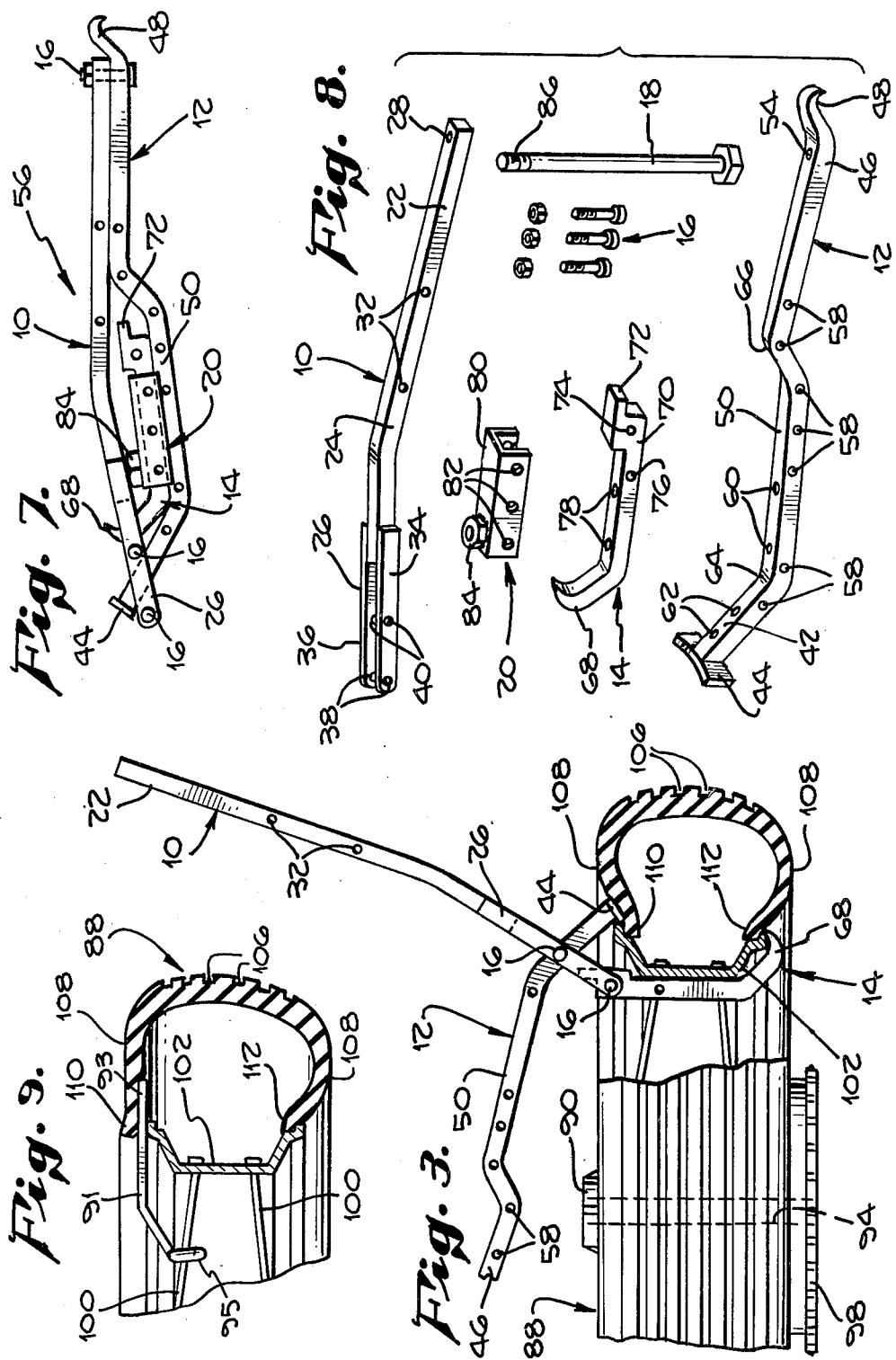

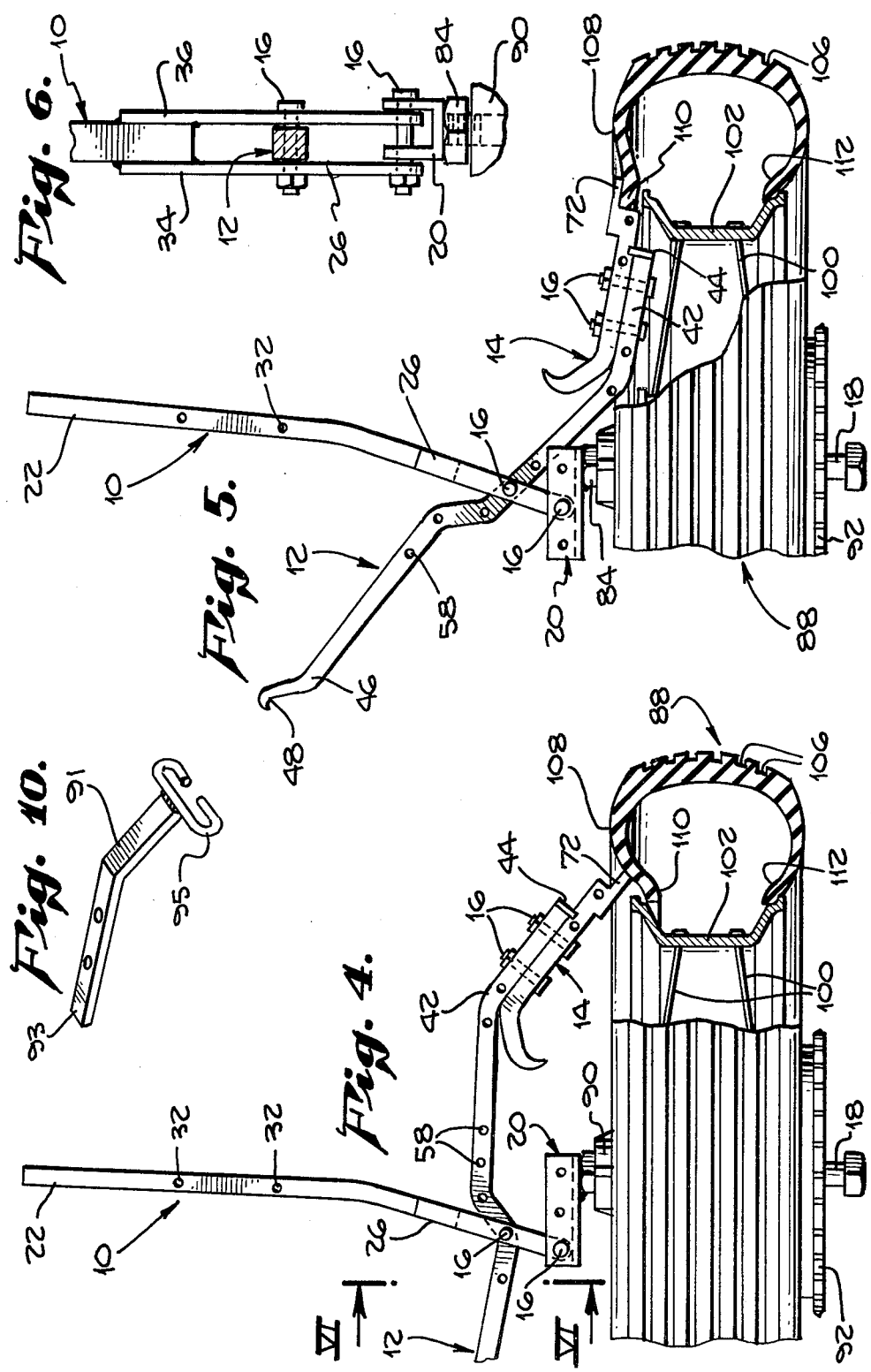

PORTABLE TIRE TOOL

BACKGROUND OF THE INVENTION

The present invention relates generally to portable tools and devices for installing and removing tires. More particularly, the present invention relates to a portable tire tool in which the same three basic tool elements may be quickly and conveniently rearranged into various configurations for both tire removal and installation.

Motorcycles have become increasingly popular for use in both everyday transportation and use as recreational vehicles. Along with the increasing popularity of motorcycles, there has been an increase in size, performance and sophistication. These factors have dictated the necessity for providing motorcycle tires and rims which are larger in size and stronger. The typical motorcycle tire includes a central hub which is connected to an outer steel rim by a plurality of spokes. For small rims such as those found on bicycles, it is a relatively simple matter to remove and replace a tire on the rim utilizing simple hand-manipulated pry equipment. However, for the much larger motorcycle tires and wheels, it is difficult, if not impossible, to remove and replace a punctured tire without resorting to high-power hydraulic equipment designed especially for this purpose. This is especially true for modern safety rims which include various ridges and bead configurations on the rim to prevent the tire from coming off inadvertently during a blowout. Also, because of cost, many people must resort to hand manipulated pry equipment. They are tolerated since there is no substitute available, and there is no guarantee during their use that the tire side wall will not tear and/or the tube will not be punctured. The pressures involved in using these pry tools are enough to pinch and puncture the tube of the tire when prying actions are commenced. If the tube is punctured, it may not be noticed until the tire is installed and pressure tested. During testing, a quiet but detectable hiss will be heard, signaling damage and the necessity to remove the tire and repair the tube.

It would be desirable to provide a portable tire removal and installation tool which is compact enough to be conveniently stored on a motorcycle, but which is also suitable for use in the field to remove and replace modern high performance tires.

SUMMARY OF THE INVENTION

In accordance with the present invention, a relatively lightweight, portable tire tool is provided which may be used for both removing and installing tires on motorcycle rims.

The portable tire tool includes three basic members: a lever arm, a tire pry arm, and a hook arm. The lever arm includes a handle portion at one end, a neck portion and a fulcrum portion at the other end. The tire pry arm includes a first end portion having a tire contact surface, a middle portion and a second end portion having a tire pry surface. The hood arm is a J-shaped member having a hook on one end, a middle portion, and a straight end portion on the other end. Both the tire pry arm and hook arm may be bolted, or otherwise connected, to the fulcrum portion of the lever arm in various different configurations which may be utilized for both removing the tire from the wheel rim and installing the tire on the wheel rim.

As a further feature of the present invention, a channel member is provided for mounting the lever arm to the central hub of the wheel rim. Depending upon the particular removal or installation operation, the lever arm may be connected to the channel member by either the lever arm handle portion or the lever arm fulcrum portion to secure the lever arm to the wheel.

The tire tool in accordance with the present invention may be assembled in six various configurations. One of these configurations is a compact assembly designed for storage and transportation of the tool. The other five configurations provide for removal of the first tire bead off of the wheel rim, forcing the tire off of the rim, and pushing the tire beads into position on the rim.

Many devices have been developed for providing field removal and installation of tires, but none provide the numerous tool configurations available with the tool of the present invention and none offer the versatility, ease of operation and the capability of being assembled into a compact configuration for storage.

The above-described, and many other features, and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a partial sectional view showing the configuration of a preferred tire tool in accordance with the present invention for prying the first tire bead away from the wheel rim.

FIG. 2 is a partial sectional view showing a configuration of the preferred tire tool for forcing the tire off of the wheel rim.

FIG. 3 is a partial sectional view showing a configuration of the preferred tire tool for forcing the tire onto the wheel rim.

FIG. 4 is a partial sectional view showing a configuration of the preferred tire tool for forcing the second tire bead onto the rim during tire installation.

FIG. 5 is a partial sectional view showing another configuration of the preferred tire tool for forcing either tire bead onto the wheel rim.

FIG. 6 is a partial view of FIG. 4 taken in the VI—VI plane.

FIG. 7 is a side view of the preferred tire tool as assembled for transportation or storage.

FIG. 8 is an exploded view of FIG. 7 showing the individual elements of the tire tool including bolts and the pivot pin that can be used for insertion in the wheel rim's central hub.

FIG. 9 is a view of the T-bar in position on a conventional wheel.

FIG. 10 is a perspective view of the T-bar utilized in accordance with the present invention.

DETAILED DESCRIPTION OF THE INVENTION

The basic individual elements of a preferred portable tire tool device in accordance with the present invention are shown in FIG. 8. The basic elements of the tire tool are: the lever arm, shown at 10; the tire pry arm, shown at 12; and the J-shaped hook arm, shown at 14. Also shown in FIG. 8 are bolts 16 which are used to connect the various arm members together in different configurations during tire removal and installation operations. Further, pivot pin 18 and channel member 20 are also shown. These two pieces provide means for rotatably mounting the lever arm 10 to the hub of a given wheel rim.

The lever arm 10 includes a handle portion 22 at one end, a neck portion 24 and a fulcrum portion 26. The handle portion has a hole 28 near the end through which a bolt is passed for securing the tire pry arm 12 thereto during storage and transportation as shown in FIG. 7. The handle portion 22 further includes mounting holes 32 through which one of bolts 16 may be passed when the lever arm 10 is mounted to the channel member 20 as shown in FIG. 1. The fulcrum portion 26 is preferably a forked-shaped member which may be formed as an integral part of the lever arm 10 or may include appropriately-sized metal tongues 34 and 36 which are welded to the lever arm neck portion 24. Holes 38 and 40 are provided in the fulcrum tongues 34 and 36. These holes 38 and 40 are of a sufficient size to allow passage of bolts 16 therethrough for mounting the tire pry arm 12 and hook arm 14 thereto as shown in FIGS. 1-5. Preferably, the lever arm 10 is bent as shown in the drawings to provide desired angles of contact between the various arm members, height from rim, and to provide a convenient storage package as shown in FIG. 7.

The tire pry arm 12 includes a first end portion 42 which includes a tire contact surface, such as cross bar 44. The tire pry arm 12 further includes a second end portion 46 which includes a tire pry surface 48. The tire pry arm 12 also includes middle portion 50.

The tire pry arm second end portion 46 includes a hole 54 which may be lined up with hole 28 of the lever arm 10 for passage of a bolt therethrough as shown in FIG. 7 to assemble the tire tool in its storage configuration as discussed above and as shown generally at 56 in FIG. 7. Holes 58 are provided through the tire pry arm middle portion 50 to provide a means for mounting the tire pry arm 12 to the fulcrum portion 26 of lever arm 10. This attachment is accomplished by aligning the various holes and passing one of bolts 16 therethrough. Of course, any other suitable pins, rods, or other suitable mounting means may be used.

The holes 60 in the tire pry arm middle portion 50 are provided for securing both the hook arm 14 and channel member 20 to the tire pry arm 12 during storage and transportation as shown in FIG. 7. The holes 62 are provided for receiving bolts or pins for mounting the hook arm 14 to the tire pry arm 12 as best shown in FIGS. 4 and 5. The tire pry arm 12 is preferably bent at 64 and 66, as shown in FIG. 8, to provide desired orientation of the lever arm 10, tire pry arm 12, and hook arm 14 during tire removal and installation operations, as well as during storage of the tool.

The hook arm 14 is a J-shaped member having a hook portion 68 on one end and a straight end portion 70 on the other end. The straight end portion 70 includes a longitudinally protruding tab 72 which may be integral with the hook arm 14 or welded thereto. The tab 72 is utilized for preventing slippage of the tool from the tire bead as shown in FIG. 5 or for applying localized pressure to the tire as shown in FIG. 4. The hook arm 14 includes hole 74 which is positioned to allow mounting of the hook arm 14 by way of a bolt 16 to the lever arm fulcrum portion 26 as shown in FIG. 3. Hole 76 is provided in hook arm 14 for mounting the hook arm 14 to the lever arm fulcrum portion 26 as shown in FIG. 2, or hole 74 may be used. Holes 78 are provided for mounting the hook arm 14 to the tire pry arm first end portion 42 by way of bolts 16 and holes 62 as shown in FIGS. 4 and 5.

The channel member 20 includes a U-shaped channel 80 having holes 82 through which bolts 16 may be passed for mounting the lever arm 10 thereto, as in FIG. 1. A plurality of holes 82 are preferred to provide adjustment of lever arm 10 mounting configurations to accomodate rims of different diameter. The channel member 20 further includes means for receiving the pin 18. Preferably this is a nut 84, or other threaded assembly, which is adapted to receive the threaded end 86 of pivot pin 18. The nut or threaded assembly 84 may either be integral with the U-channel 80 or may be welded thereto so long as it is securely fastened.

All components of the preferred tire tool are made from high strength steel and steel alloys which have sufficient strength to withstand forces necessary to remove and install tires without deforming or breaking. Preferably, the lever arm 10, tire pry arm 12 and hook arm 14 are made from one half-inch square steel rod which is bent and formed to the desired configurations. The pivot pin 18 is also preferably made from a suitably strong metal such as those typically employed as axles for motorcycle wheels. The preferred pivot pin 18 is the axle from the wheel on which a given tire is to be changed. The channel member 20 is preferably, also, made from high strength steel materials, as is the T-bar 91.

The T-bar 91 is a T-shaped piece of metal used to position the tire sidewall and beads during various operations. The T-bar is shown in FIG. 10 at 91. The T-bar 91 includes a straight end 93 for insertion between the rim and tire as shown in FIG. 9. The T-bar 91 also included spoke attachment end 95. The end 95 is designed to releasably engage the spokes 100 as shown in FIG. 9 to securely position T-bar 91. The use of T-bar 91 prevents the tire 88 from slipping back onto the rim during removal operations. The T-bar 91 is bent to provide desired positioning when in use (FIG. 9). This bent T-bar 91 configuration also allows it to be conveniently inserted into the compact tool assembly shown in FIG. 7. The inserted T-bar 91 is not shown in FIG. 7; however, when inserted, the T-bar 91 would be positioned between the lever arm 10 and the tire pry arm 12 and preferably between the tire pry arm 12 and the hook arm 14 with the spoke attachment end 95 sticking out between the arms of lever arm fulcrum portion 26.

Referring to FIG. 1, a typical motorcycle wheel and tire assembly is shown generally at 88. The wheel includes a central hub portion 90. The hub portion shown in FIG. 1 is designed for driving the wheel assembly and, therefore, includes drive sprocket 92. The central hub 90 includes an axle hole 94 (shown in phantom) for mounting the wheel 88 on an axle. During tire removal operations, the wheel 88 is placed on suitable supports 96 and 98. Although the use of supports similar to those shown at 96 and 98 are desirable to provide convenient positioning of the wheel 88, they are, of course, not necessary. The central hub 90 is connected by way of spokes 100 to the wheel rim 102. The tire 104 is mounted on the rim 102. The tire 104 includes tread portion 106, sidewalls 108, and first tire bead 110 and second tire bead 112.

The preferred tire tool configuration shown in FIG. 1 is designed to remove the tire bead 110 from the rim 102. The lever arm 10 is mounted to the channel member 20 which is in turn rotatably secured to the central hub 90 by way of pivot pin 18, which most conveniently is the axle of wheel 88. As is apparent, the various holes 82 in the channel member 20 provide for adjustment so that the lever arm 10 may be utilized for rims 102 having different diameters. Preferably, a bolt 16 is placed through holes 38 in the lever arm fulcrum portion 26. The tire pry arm pry surface 48 is then inserted underneath the tire bead 110, by way of using cross bar 44 as a hand held pushing surface. The tire pry arm 12 is then leveraged against bolt 16 by pulling the first end portion 42 inward as indicated by arrow 114. After the tire bead 110 has been pried up and over rim 102, the T-bar 91 is inserted in the space between tire bead 110 and rim 102 with the end 95 being hooked around spokes 100 as previously discussed and shown in FIG. 9. The tire pry arm 12 may then be removed. The lever arm 10 is then rotated to another position along rim 102 with the tire pry surface 48 being again inserted between the rim 102 and tire bead 110 to repeat the process until the bead is pryed away from the rim around its entire perimeter, perferably the T-bar 91 staying in its original inserted position during the entire tire removal operation.

FIG. 2 shows a preferred configuration for exerting pressure on the tire sidewall 108 for tire removal. The hook arm 14 is connected to the fulcrum portion 26 through holes 38 utilizing bolt 16. The tire pry arm 12 through one of holes 58 is connected to the fulcrum portion by way of bolt 16 through holes 40. As will be realized, the various holes 58 in the tire pry arm 12 provide for adjustment of the tire pry arm 12 relative the lever arm 10 to provide for operation on different size tires. The lever arm handle portion 22 is forced downward as indicated by arrow 116 to apply pressure to the tire sidewall 108 by way of the cross bar 44. The hook arm 14 is hooked to rim 102 by way of hook 68 to provide the necessary leverage attachment for pressing the tire 88 away from rim 102.

FIG. 3 is a similar configuration to the preferred tool setup shown in FIG. 2. The hook arm 14 is reversed so that it hooks the inside of rim 102 as opposed to the outside of rim 102 as shown in FIG. 2. Further, the tire pry arm 12 is mounted to the fulcrum portion of lever arm 10 through a hole 58 which is closer to the tire pry arm first end portion 42. This preferred configuration is particularly useful in forcing the tire sidewalls 108 and tire bead 110 down over the rim 102 during tire installation.

FIGS. 4 and 5 depict preferred configurations in which the hook arm 14 is secured to the tire pry arm first end portion 42 as previously discussed. The tire pry arm 12 is pivotally mounted to the lever arm 10 which in turn is secured to the tire hub 90 by way of channel member 20 and pin 18. The difference between the configurations shown in FIGS. 4 and 5 is that the tire pry arm 12 is inverted in FIG. 5 from the position shown in FIG. 4. The configuration in FIG. 4 provides desirable localized pressure application to the tire sidewall 108 or bead 110 at a preferred downward angle. In FIG. 5, more radially outward pressure can be applied using the shown configuration. The tab 72 protruding from the hook arm 14 is especially desirable to prevent the tire bead 110 from slipping over the hook arm 14 while the tire bead 110 is being forced outward due to leverage applied by the outward movement of lever arm 10.

FIG. 7 shows the preferred tire tool when it is assembled in compact form for storage or transportation. As previously discussed, a bolt 16 is positioned through holes 28 and 54 in the lever arm 10 and tire pry arm 14, respectively, to hold those ends together. As shown in FIG. 7, the tire pry arm first end portion fits conveniently into the forked section of the fulcrum portion 26 to provide a particularly compact package. The hook arm 14, channel member 20, and T-Bar 91 (not shown) also conveniently fit in the space between the lever arm neck portion 24 and tire pry arm middle portion 50 where they are securely held in place when bolt 16 is secured through holes 28 and 54.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A portable tire tool kit adapted for removing and installing tires on wheel rims having central hubs comprising:
    a lever arm having a handle portion at one end, a neck portion, and a fulcrum portion at the other end;
    a tire pry arm having a first end portion including a tire contact surface, a second end portion including a tire pry surface and a middle portion;
    a J-shaped hook arm having a hook portion on one end, a middle portion and a straight end portion on the other end;
    mounting means for rotatably mounting said lever arm to said wheel rim central hub;
    means associated with said lever arm handle portion for releasably connecting said lever arm to said mounting means;
    means associated with said lever arm fulcrum portion for connecting alternately to said mounting means, said hook arm middle portion and said tire pry arm tire pry surface; and
    means associated with said lever arm fulcrum portion for releasably connecting to said tire pry arm middle portion, said tool kit being connectable in various configurations for removing and installing tires.

2. A tool kit according to claim 1 wherein said tire pry arm includes means associated with said tire pry arm second portion for releasably mounting said hook arm.

3. A tool kit according to claim 2 wherein said hook arm includes a tab protruding longitudinally from said hook arm straight end for contacting said tire during tire removal and installation.

4. A tire tool according to claim 3 wherein means are provided for varying the angle at which said hook arm tab approaches said tire when moved outward by said lever arm.

5. A tire tool kit according to claim 1 including means for connecting said lever arm handle portion to said tire pry arm second end portion, means for connecting said lever arm fulcrum portion to said tire pry arm first end portion, and means for connecting said hook arm to said tire pry arm middle portion to form a compact configuration for transporting said tire tool.

6. A tire tool according to claim 1 wherein said fulcrum portion is a forked-shaped member longitudinally attached to said lever arm.

7. A tire tool according to claim 1 wherein said tire pry arm and lever arm are about the same length.

8. A tire tool kit according to claim 1 wherein said tire pry arm tire contact surface is a cross bar attached to the first end of said tire pry arm.

9. A tire tool kit according to claim 1 further including a T shaped bar having one end for prying and holding said tire and the other end for releasably securing said T shaped bar to said wheel rim.

* * * * *